INVENTOR.
MYRON L. GREENBERG
BY
Barnes, Kisselle, Raisch & Choate
ATTORNEYS

Feb. 3, 1970    M. L. GREENBERG    3,493,273
HYDROSTATIC MACHINE TOOL SPINDLE
Filed Feb. 9, 1968    3 Sheets-Sheet 2

INVENTOR.
MYRON L. GREENBERG
BY
Barnes, Kisselle, Raisch & Choate
ATTORNEYS

INVENTOR.
MYRON L. GREENBERG
BY
Barnes, Kisselle, Raisch & Choate
ATTORNEYS

United States Patent Office
3,493,273
Patented Feb. 3, 1970

3,493,273
HYDROSTATIC MACHINE TOOL SPINDLE
Myron L. Greenberg, Union Lake, Mich., assignor to The Babcock & Wilcox Company, New York, N.Y., a corporation of New Jersey
Filed Feb. 9, 1968, Ser. No. 704,305
Int. Cl. F16c 17/16, 29/02, 1/24
U.S. Cl. 308—9                                7 Claims

ABSTRACT OF THE DISCLOSURE

The machine tool spindle disclosed herein comprises a housing having a bore and a rotor within said bore. The bore of the housing and the rotor have complementary axially extending longitudinally spaced sets of cooperating surfaces. Each of the surfaces in the bore has circumferentially spaced pressure pockets and associated restrictors therein. The rotor further includes a plurality of annular radially extending flanges or projections and the housing has complementary radially extending surfaces each of which has circumferentially spaced pressure pockets and associated restrictors. Means are provided for supplying fluid under pressure to each of the pressure pockets and for draining the fluid flowing from the pressure pocket between the complementary surfaces.

---

This invention relates to machine tool spindles and particularly to hydrostatic machine tool spindles.

One type of machine tool spindle that has heretofore been used successfully is the hydrostati machine tool spindle such as shown in the patent to Gordon H. Porath No. 3,223,463. Such a machine tool spindle has been very successful and is effective in providing for stable support of a tool or workpiece without friction and in accurate relation. Because of their considerable precision, these spindles are often used with feed slides at a station of a multifunction sequential machine such as a transfer line or dial index machine for finish or semifinish boring of holes. As is well known, it is impossible to bore a hole without developing axial thrust, especially when, as is common, multipoint tools are used. Further, since production machinery frequently becomes misaligned or suffers from control failures in service, these boring spindles must be able to withstand the full force of the feed slide actuator when the tool bottoms in a blind hole or on part of the workpiece fixture or on the edge of the rough hole due to fixture or transfer apparatus misalignment or malfunction. Since feed slide actuators, which are often hydraulic cylinders or lead screw and clutch devices, must have a considerable excess capacity of thrust over that actually needed for boring in order to ensure smooth feeding under all production conditions, it will be clear that such spindles are often subjected to quite large axial thrust loads.

The thrust capacity of any hydrostatic spindle is determined by the area of the thrust plate, the efficiency of the thrust bearing geometric configuration, and the available fluid pressure. Since overall spindle size is considerably restricted in installations for engine block boring and the like, it is usually dfficult to obtain enough thrust capacity in hydrostatic spindles for these applications. The usual compromise is to accept destruction of the spindle on the comparatively infrequent occasions of impacts, or else not to use hydrostatic bearings. Spindles are sometimes operated at very high hydraulic pocket pressures, but one usually finds that this adds more problems than it cures, especially in these smaller sized units.

Another application problem occurs when considerable thrust capacity is needed, and the rotational speed of the spindle is high. Iarge thrust plates are very disadvantageous in this situation becaues the shear friction, and so the torque requirement, increases as the fourth power of outside diameter for such a spindle.

Among the objects of the present invention are to provide a hydrostatic machine tool spindle that is relatively compact in a radial direction and at the same time will withstand high thrust loads, and is not unusually restricted in rotational speed.

Figure 1:
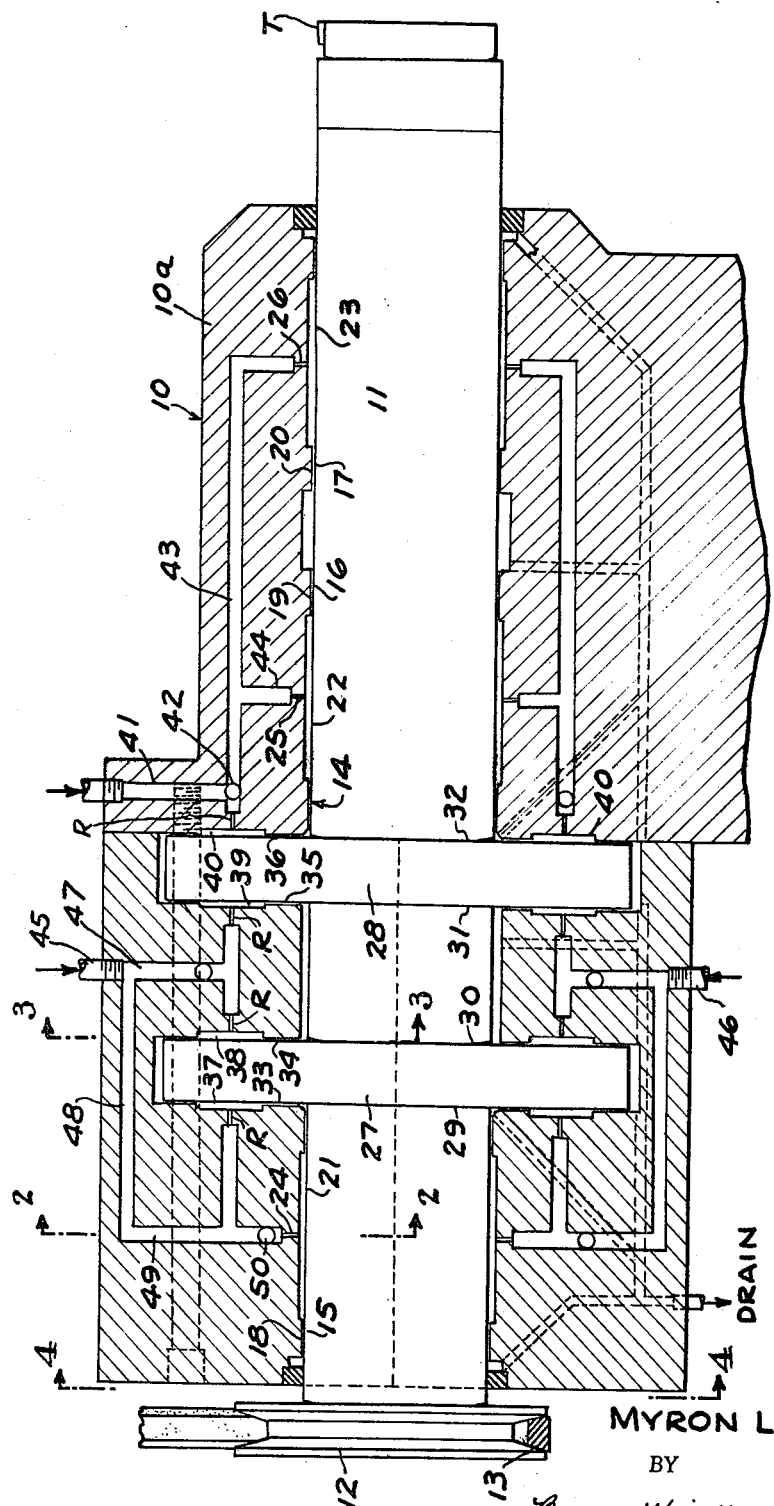
FIG. 1 is a longitudinal sectional view through a hydrostatic machine tool spindle embodying the invention.
Figure 2:
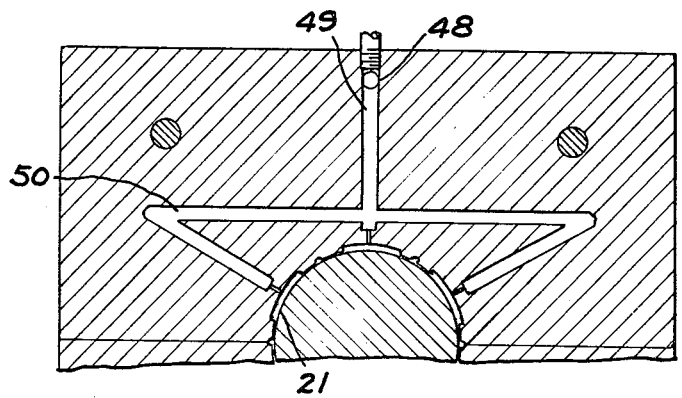
FIG. 2 is a fragmentary sectional view taken along the line 2—2 in FIG. 1.
Figure 3:
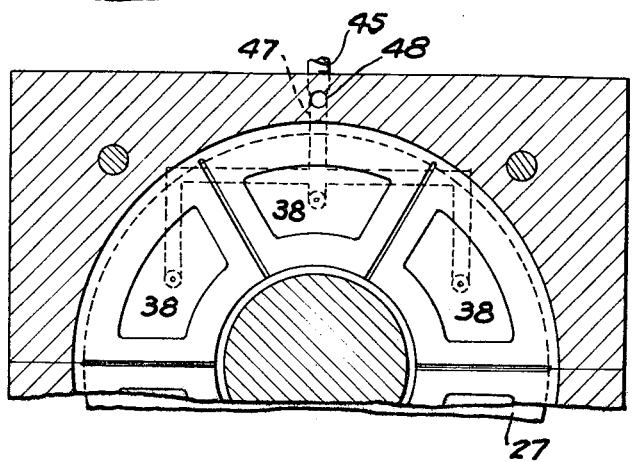
FIG. 3 is a fragmentary sectional view taken along the line 3—3 in FIG. 1.

Referring to FIG. 1, the hydrostatic machine tool spindle embodying the invention comprises a housing 10 that may be mounted in fixed position or on a slide and rotatably supports a rotor 11 on which a tool T is positioned. The rotor 11 is rotated within the housing 10 by suitable means such as a pulley 12 that is driven by a belt 13.

The housing 10 has a bore 14 for receiving the rotor 11. The bore 14 includes longitudinally spaced annular surfaces 15, 16, 17 which are complementary to surface portions 18, 19, 20 on the rotor. Surfaces 15, 16, 17 are provided with circumferentially spaced pressure pads or pockets 21, 22, 23 each of which has a restrictor 24, 25, 26, such as a capillary tube, associated therewith.

The rotor 11 further includes longitudinally spaced radially extending annular projections or flanges 27, 28 that have accurately formed radial surfaces 29, 30, 31, 32. The housing 10 comprises radial surfaces 33, 34, 35 and 36 each of which has circumferentially spaced pressure pockets 37, 38, 39, 40 and associated restrictors R therein.

Fluid under pressure is supplied as presently described to each of the pressure pockets causing fluid flow between the complementary surfaces to maintain the rotor 11 in stable accurate relationship to the housing. The provision of two or more flanges 27, 28 provides substantial thrust surface so that the machine tool spindle will withstand large thrust loads.

Figure 4:
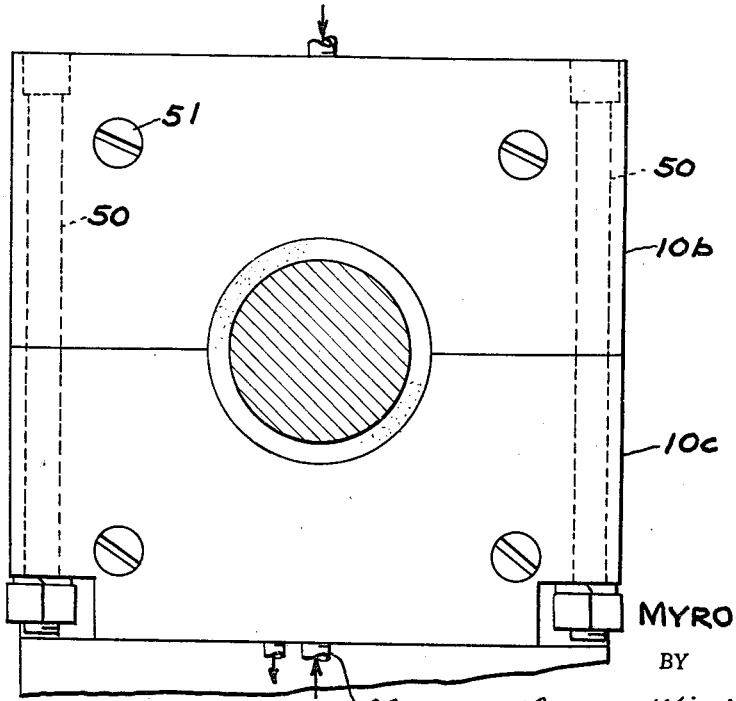
FIG. 4 is a fragmentary sectional view taken along the line 4—4 in FIG. 1.

Referring more specifically to FIG. 1, the housing 10 includes a first section 10a which is made in one piece and has a portion of the bore 14 therein and the surface 36 formed on one end thereof. The housing 10 further includes two complementary sections 10b, 10c (FIG. 4) which have the other portion of the bore 14 therein and the surfaces 33, 34 therein. The section 10a has an inlet 41 that extends to an annular passage 42 communicating with each of the pressure pads 40 and axial passages 43 extending from annular passage 42 and communicating with radial passages 44 that extend to the pressure pockets 22, 23 for supplying fluid thereto.

The sections 10a, 10b include inlets 45, 46 that extend to transverse passage 47 to the pressure pockets 38 and 39 in the respective section. Each section 10a, 10b further includes an axial passage 48 that extends to transverse passages 49, 50 for supplying fluid under pressure to the pressure pad 37 as well as the pressure pads 21.

Drain passages are provided in the first section 10a and the section 10c and fluid seals are provided adjacent the ends of the housing 10.

The machine tool spindle shown in FIG. 1 is assembled by positioning the rotor 11 within the section 10a and thereafter bringing the sections 10b, 10c into position around the flanges 27, 28 of the rotor and fastening the flanges to one another by bolts 50 and to the section 10a by screws 51.

Figure 5:
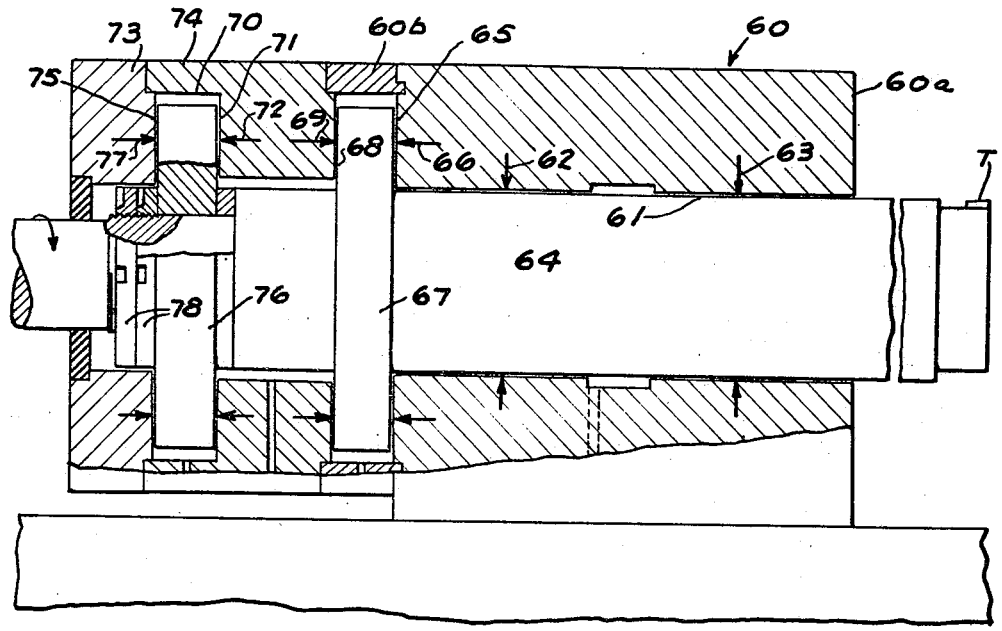
FIG. 5 is a partly diagrammatic longitudinal sectional view through a modified form of machine tool spindle.

In the form of the invention shown in FIG. 5, the hydrostatic pressure pockets and associated restrictors are shown in the form of arrows for purposes of clarity. Housing 60 is made of a first one piece section 60a having a bore 61 that has the longitudinally spaced pressure pockets 62, 63 therein for receiving the rotor 64. Section 60a includes one radial surface 65 with circumferentially spaced pressure pockets and restrictors 66.

The housing 60 further includes a secoond section 60b which is annular and spaces a third integral section 60c from the surface 65 to define a space for receiving the first flange 67 of the rotor 64. Section 60c includes a radial surface 68 having pressure pockets and associated restrictors 69 thereon.

Section 60c further includes a stepped cut-away portion 70 defining a radial surface 71 in which pressure pockets and associated restrictors 72 are provided. It will be understood that pieces 60b and 60c can, if desired, be combined into one piece for ease of manufacturing.

The housing 60 finally includes a fourth solid annular section 73 that engages the periphery 74 of section 60c and has a radial surface 75 defining a pocket for receiving the flange 76 of the rotor 64. Surface 75 has circumferentially spaced pressure pockets and restrictors 77 thereon adjacent the corresponding surface of the flange 76.

As shown in FIG. 5, flange 76 is removably mounted on rotor 64 by removable plates 78 that are threaded on a reduced portion of the rotor 64.

Fluid is supplied to each of the pressure pockets through appropriate passages and drained from the machine tool spindle as in the previous form of the invention.

Figure 6:
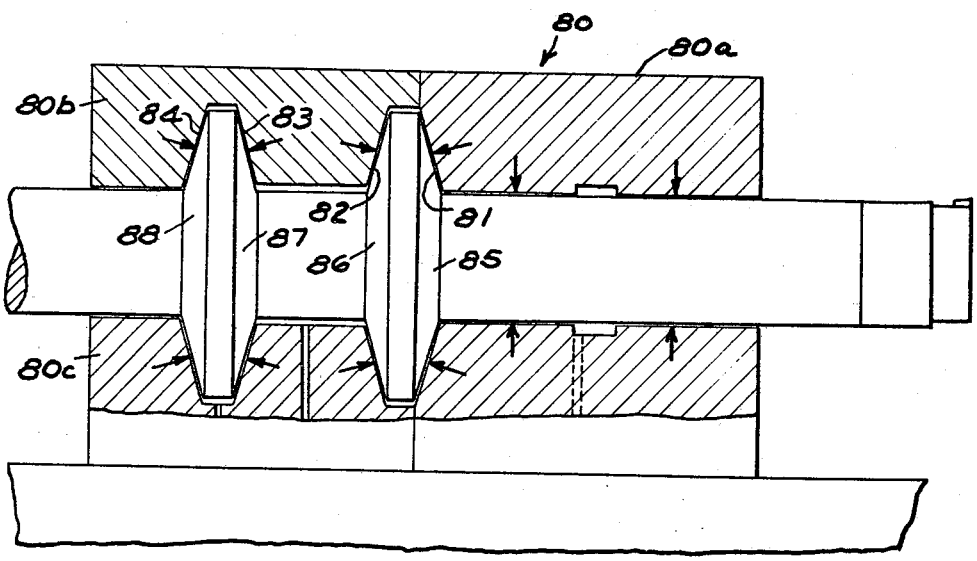
FIG. 6 is a partly diagrammatic longitudinal sectional view through a further modified form of machine tool spindle.

In the form of the invention shown in FIG. 6, the housing 80 comprises three sections 80a, 80b, 80c. These sections are similar to the sections of the housing shown in FIG. 1 except that the radial surfaces 81, 82, 83, 84 are inclined to the true radial plane as are the complementary surfaces 85, 86, 87, 88 on the rotor. By this arrangement the inclined complementary surfaces provide both radial and thrust loads on the rear portion of the rotor.

Although each of the forms of the invention has been described as having two radial flanges, in accordance with the invention, at least two or more radial flanges should be provided.

What is claimed is:

1. In a machine tool spindle, the combination comprising
    a housing,
    said housing having a bore therein,
    a rotor in said bore,
    said rotor and said housing having complementary axially extending longitudinally spaced annular surfaces,
    a plurality of circumferentially spaced pressure pockets in each of said surfaces of said housing,
    a restrictor associated with each said pressure pocket,
    said rotor having longitudinally spaced annular radially extending flanges,
    each said flange having spaced radially extending annular surfaces,
    said housing having annular radially extending surfaces complementary to the radial surface on said flanges,
    a plurality of circumferentially spaced pressure pockets on each of said radial surfaces of said housing,
    a restrictor associated with each said last mentioned pressure pocket,
    and means for supplying fluid under pressure to each of said restrictors.

2. The combination set forth in claim 1 wherein said housing comprises a first section having a portion of said bore therein, and a pair of sections mounted on said first section and defining the other portion of said bore, said pair of sections being separable along a radial plane, one of said radial surfaces of said housing being on one of said pair of sections, the other radial surfaces of said housing being on the other of said pair of sections.

3. The combination set forth in claim 1 wherein said housing comprises a first section having a bore therein,
    a second annular section fixed to said first section,
    a third annular section having a bore therein aligned with said first and second section,
    said first section having longitudinally spaced circumferentially spaced pressure pockets therein,
    said first and third sections having two of said radial surfaces and associated pockets thereon,
    said third section having a stepped portion,
    a fourth section having a bore therein aligned with the bores of said third and first sections,
    said stepped portion of said third section and a portion of said fourth section having additional radial surfaces thereon and associated pockets for receiving one of said radial projections on said rotor.

4. The combination set forth in claim 3 wherein the flange of said rotor which is associated with the third section of said housing is removably mounted on said rotor.

5. The combination set forth in claim 1 wherein said radial surfaces are at an angle to a radial plane such as to absorb axial and radial loads.

6. The combination set forth in claim 1 wherein said housing comprises a first section having a bore therein,
    said first section having a recessed portion for receiving one of said flanges,
    a second annular section having a bore therein aligned with said bore of said first section,
    said second annular section having an annuluar recessed portion for receiving another of said flanges,
    and a third section having a bore therein aligned with the bores of said first and second sections,
    said first, second and third sections having interengaging annular stepped portions and shoulders.

7. The combination set forth in claim 6 wherein said annular depressed portion of said first section is formed by a removable portion of said first section.

References Cited

UNITED STATES PATENTS

| | | | |
|---|---|---|---|
| 602,589 | 4/1898 | Sellers | 308—162 |
| 1,906,715 | 5/1933 | Penick | 308—9 |
| 3,223,463 | 12/1965 | Porath | 308—9 |

OTHER REFERENCES

Air Lubricated Bearings, published in Product Engineering, pages J2, through J5 in the 1963 Annual Handbook.

MARTIN P. SCHWADRON, Primary Examiner

FRANK SUSKO, Assistant Examiner

U.S. Cl. X.R.

308—122, 168